Aug. 5, 1958　　　E. LORD　　　2,845,837
METHOD OF AND MEANS FOR MEASURING THE
STAPLE LENGTH OF FIBRES
Filed Sept. 14, 1954　　　　　　　　　5 Sheets-Sheet 1

INVENTOR:
EDMUND LORD
BY:

Aug. 5, 1958

E. LORD 2,845,837

METHOD OF AND MEANS FOR MEASURING THE
STAPLE LENGTH OF FIBRES

Filed Sept. 14, 1954

INVENTOR:
EDMUND LORD
BY:

Aug. 5, 1958

E. LORD 2,845,837

METHOD OF AND MEANS FOR MEASURING THE
STAPLE LENGTH OF FIBRES

Filed Sept. 14, 1954

INVENTOR.
EDMUND LORD
BY:

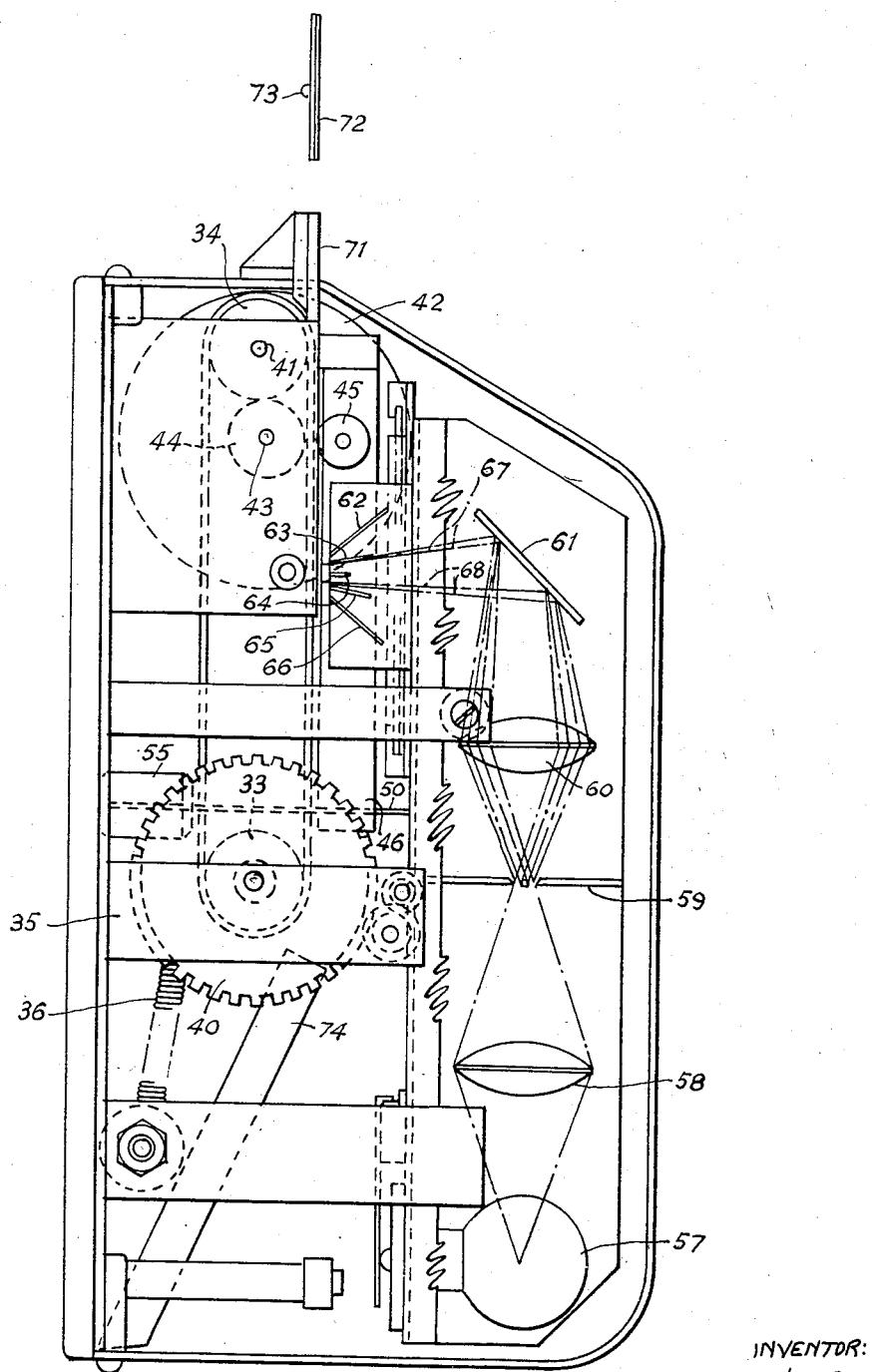

United States Patent Office 2,845,837
Patented Aug. 5, 1958

2,845,837

METHOD OF AND MEANS FOR MEASURING THE STAPLE LENGTH OF FIBRES

Edmund Lord, East Didsbury, Manchester, England, assignor to The British Cotton Industry Research Association, Shirley Institute, Didsbury, Manchester, England, a British association Application September 14, 1954, Serial No. 455,880

10 Claims. (Cl. 88—14)

This invention relates to an improved method of and means for measuring the staple length of fibres, such information being frequently required for example in the textile industry, for instance for grading or comparing samples of cotton or other natural or artificial fibres.

At present the obtaining of such information is a relatively lengthy and skilled operation. A sample of the fibre is firstly manually drawn, then projecting fibres extracted from one fringe until all the fibres are substantially co-terminous, i. e. the fringe has been substantially removed and then fibres are extracted from the other fringe taking the longer fibres first and laying them in groups to produce a layer of uniform thickness, and with the longest fibres at one end down to the shortest at the other end of the layer and with one line of fibre ends forming substantially a straight line. This is known as the operation of preparing a sorter diagram.

By another method, after preparing a layer of fibres in combs and using light-sensitive electrical apparatus, a graph is obtained from which information of various kinds relating to the length of the fibres may be extracted by geometrical or mathematical methods.

The object of the present invention is an improved and simplified method of, and means for obtaining information regarding the staple length of fibres in a specimen or sample.

The invention comprises the method of measuring the staple length of fibres in a specimen of loose fibres comprising the several steps of preparing from such specimen a double fringed sample layer having its fibres substantially parallel, and ascertaining the modal length of the fibres in the specimen from the distance between parallel lines, one at each fringe, across the fibres, at which lines the visual rate of change of number of fibres is a maximum on movement to either side of each said line.

The positions of the said parallel lines, one at each fringe may be ascertained optically for each fringe in turn by the projection onto the fibres of two parallel lines of light at a small fixed distance apart, observing photoelectrically the light reflected at each said line of light, comparing such observations electrically and effecting movement of said lines of light simultaneously and relative to the specimen towards or away from the ends of the fibres until a position of maximum difference of reflection at such lines of light is indicated by said electrical comparison.

The invention also comprises apparatus for carrying out the method aforesaid.

In the accompany drawings:

Figs. 5 and 6 are elevations from opposite sides of Fig. 4.

Figure 1:
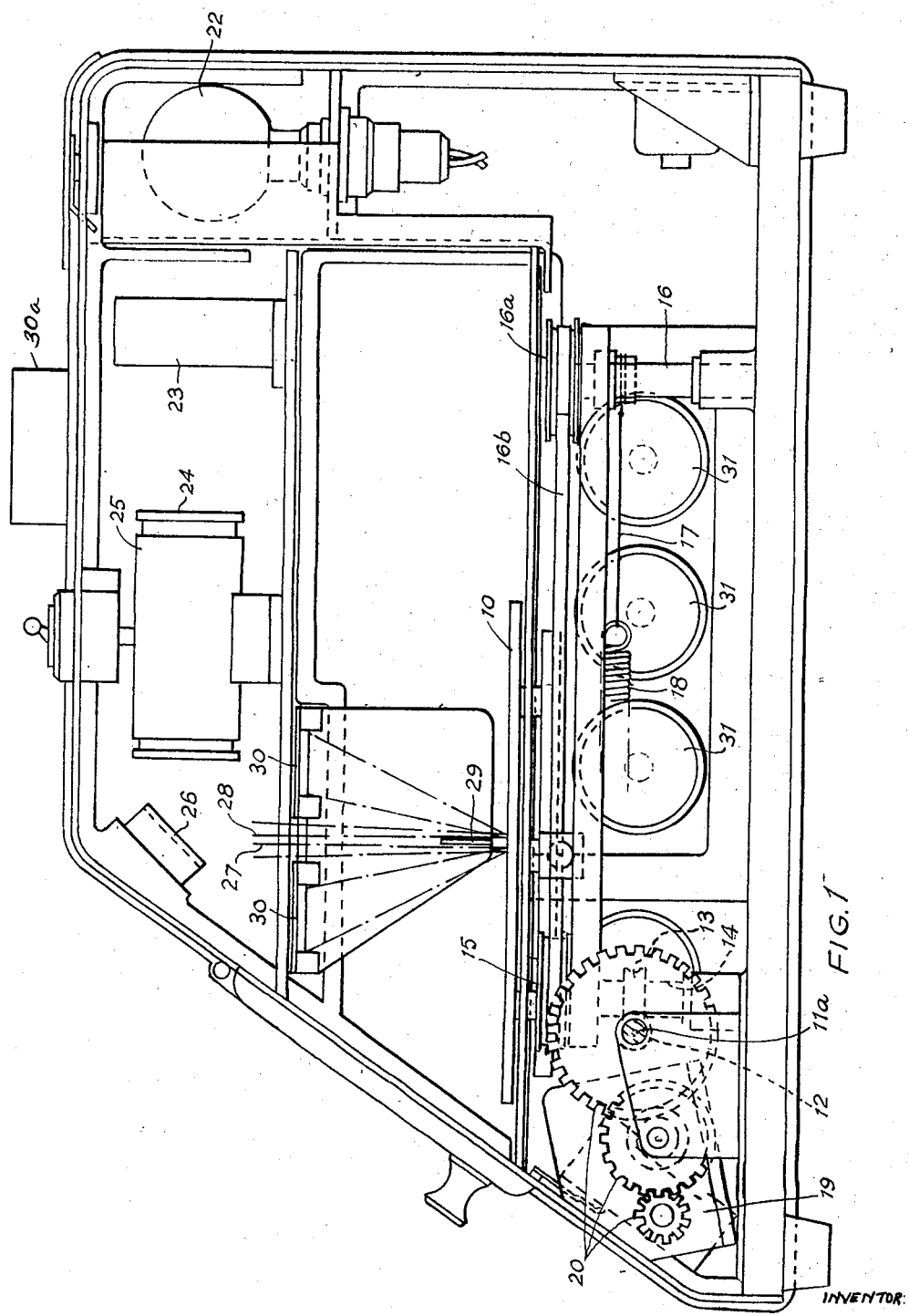
Fig. 1 is a side elevation of one example of electro-optical instrument for carrying out the method aforesaid.
Figure 2:
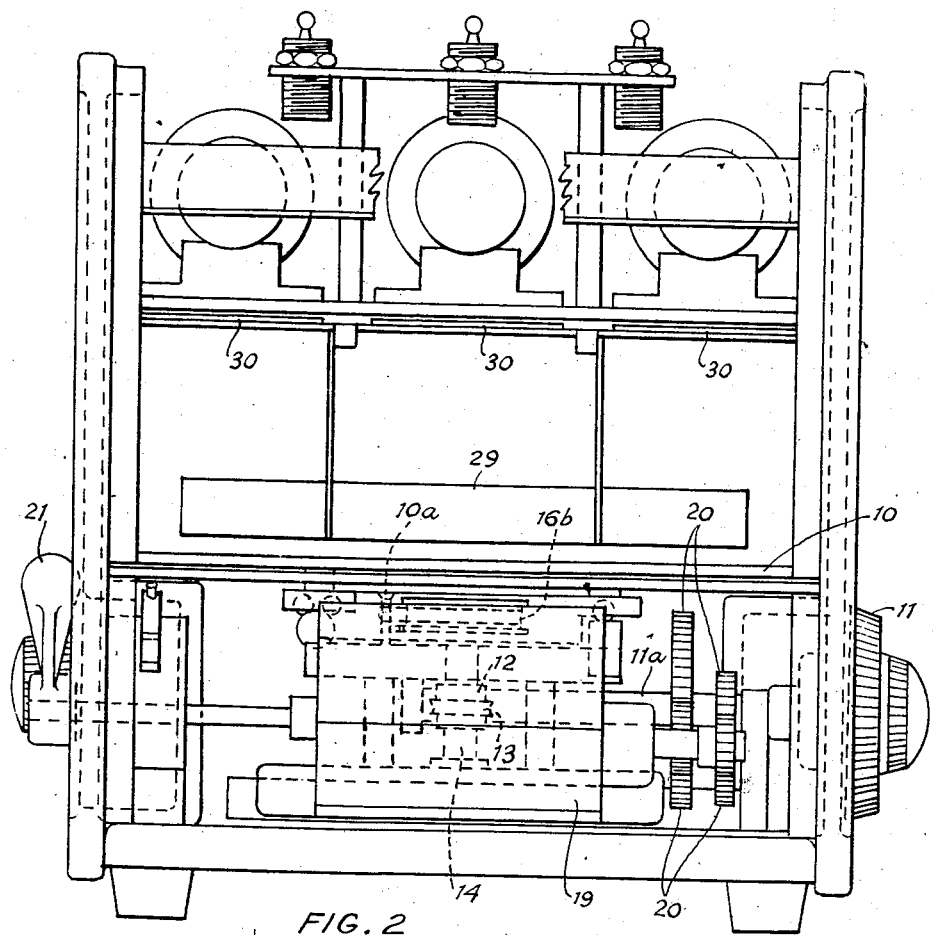
Fig. 2 is an end view of Fig. 1 with the cover removed.

The instrument shown in Figs. 1 to 2 is constructed to test three samples simultaneously so as to obtain an average reading therefrom. It comprises three separate optical assemblies arranged in line one for each sample, as described later, and a platform 10 slidably movable below the optical assemblies. Means for moving the platform comprises a rotatable knob 11 coupled through reduction gearing consisting of a worm 12 and worm wheel 13, the latter mounted on a vertical shaft 14 to the upper end of which is attached a drum 15. At the rear end of the instrument is a second vertical shaft 16 carrying a drum 16a and having a spring return system consisting of a cord 17 and coil spring 18. A thin steel tape 16b is secured at its ends to the drums 15 and 16a and the tape 16b is fastened to the platform 10 by a wedge 10a.

Adjacent the shaft 11a of such knob 11 is a resettable Veeder type counter 19 coupled through gearing 20 to the said shaft and calibrated to indicate linear movements of the platform in suitable units. The counter has a zero reset lever 21.

Each optical system comprises means, such as a lamp 22, condenser 23, slit mask 24, lens system 25, and mirror 26, for projecting onto the platform two beams 27, 28 of light falling as parallel lines onto the platform at a spacing of between 1/16 and 1/8 inch apart. Depending from the superstructure is a partition 29, the lower edge of which comes close to the platform and immediately between the said two lines of light. On each superstructure, and arranged so as to "observe" light reflection from each line of light is a photo-electric cell 30. The six photo-electric cells from the optical system are coupled together in groups, three and three, so that those on the same side are additive and the two groups connected to opposite sides of a sensitive galvanometer 30a so as to be in opposition. Suitable variable potentiometers 31 are included in the circuits to provide compensation for any differences in light intensity of the images and in sensitivity of the individual photo-cells so that "zero" setting for the galvanometer may be effected.

In principle, the instrument is designed to measure the modal or most frequent staple length of a sample of fibres arranged in the form of a fringe or thin layer. A test sample is prepared of suitable size, having its fibres arranged in parallel alignment with their mid-points disposed substantially along a straight line perpendicular to their axes. The sample is prepared by manual operations, using a comb to assist in the straightening of the longer fibres and in the removal of very short ones. The sample is placed on a suitable pad, conveniently a thin metal plate covered with short pile black velvet.

Figure 3:
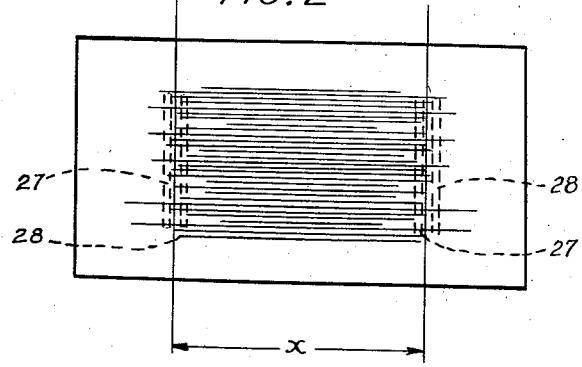
Fig. 3 is a diagram of a test sample.

The staple length of a sample of fibres prepared in this way is best defined by the modal or most frequent length. The lines 27 and 28 on the two fringe edges of the sample as shown in Fig. 3 indicate the position of the lines of light where the rate of change of visual density along the fibre axis is a maximum. The distance $x$ between such parallel lines, at each fringe where such condition obtains is the modal staple length. The instrument is used to determine the positions of such lines and their distance apart, which latter is conveniently registered on a recording counter.

In use, the prepared samples are placed on the platform transversely in line and one below each optical system with their fringes substantially in line across the platform. The knob is turned to advance the platform until the first maximum is obtained, the counter mechanism is re-set to zero and the knob then turned advancing the platform until the fringes at the other end of each sample come under the lines of light. The galvanometer will immediately indicate greater light reflection from one line of light than from the other and there will again be a position for the platform where the galvanometer shows a maximum reading, which will ascertain a theoretical line at which maximum difference of reflection obtains. These theoretical lines as previously stated are indicated on Fig. 3.

The distance $x$ between the two maximum positions aforesaid as indicated by the counter gives the modal length for the fibres averaged over the three samples.

Whilst these results depend upon the preparation of the samples so that, as far as possible their mid-points are substantially on a line transverse of their axis, the measurement could be obtained from samples in which the fibres at one end are substantially co-terminous on a transverse line, i. e. there is substantially no fringe, but this entails more preparation of the samples.

Figure 4:
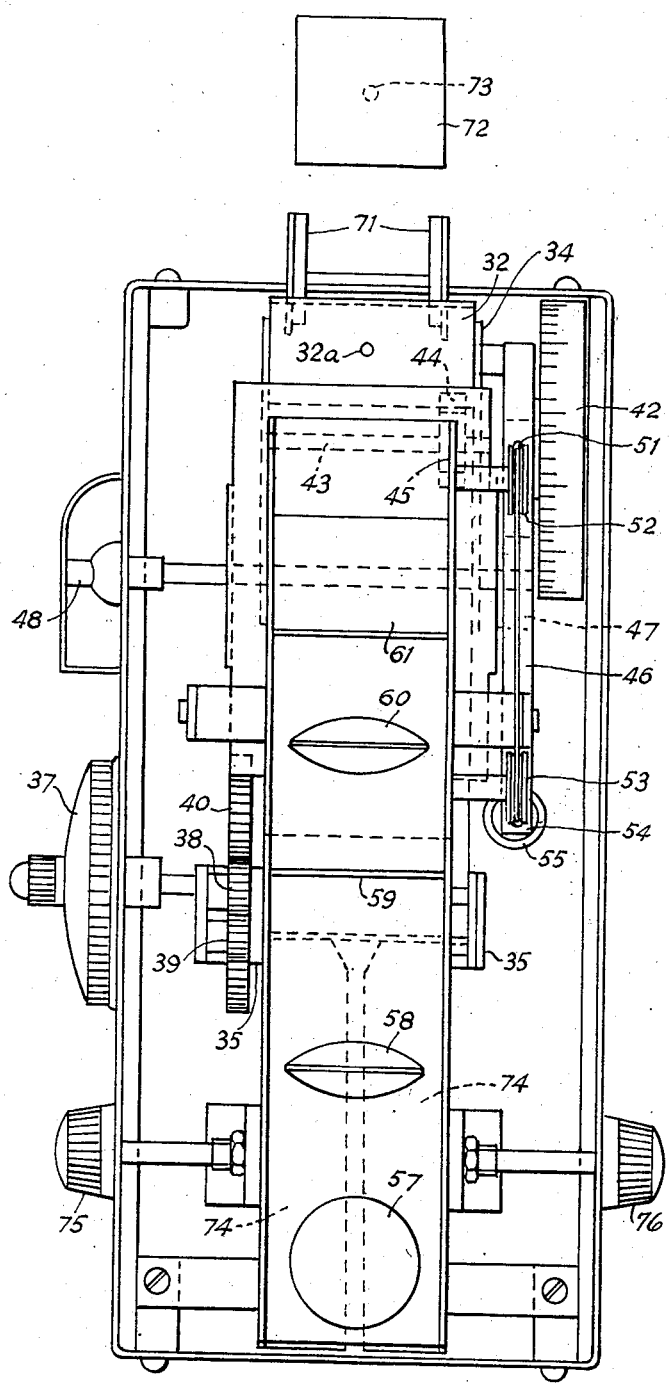
Fig. 4 is a plan of a modified construction of apparatus according to the invention.
Figure 5:
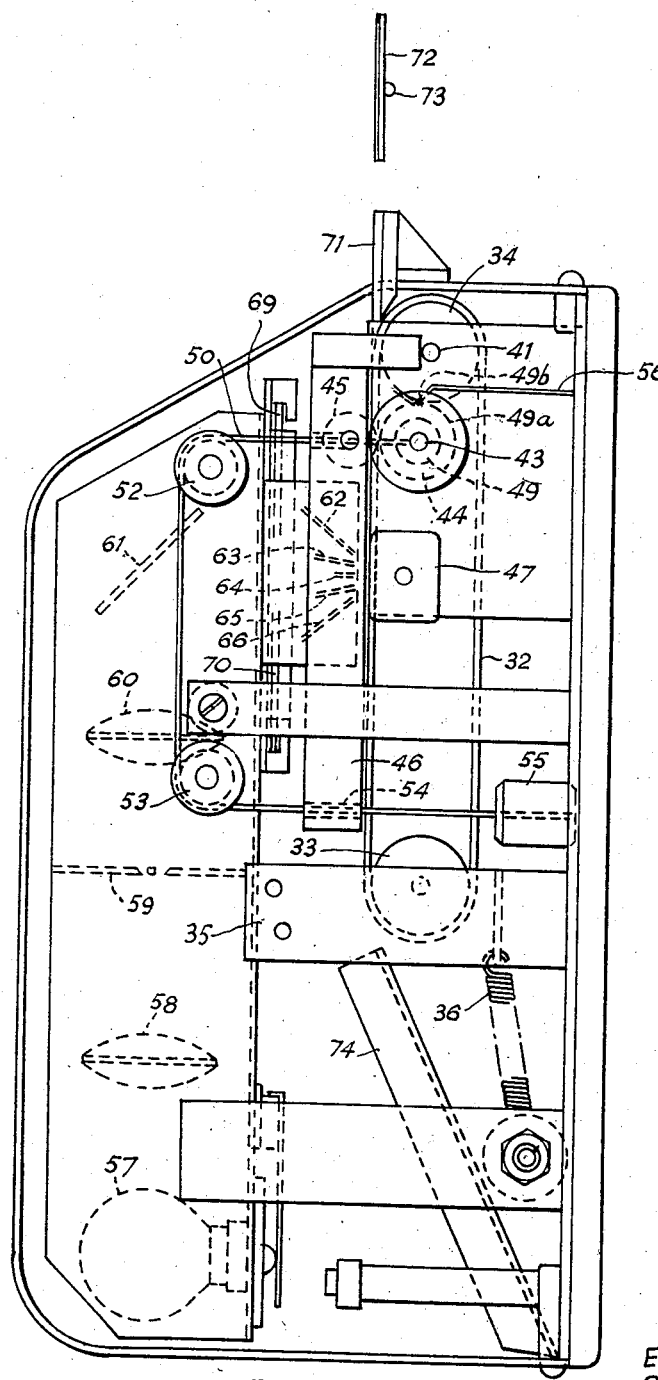

In the modified example of the invention as shown in Figs. 4, 5 and 6, the device comprises an endless conveyor belt 32 mounted on rollers 33, 34. The roller 33 is carried by a swinging arm 35, loaded by a belt tensioning spring 36. The roller is adapted to be driven by a handle 37 through reduction gearing 38, 39 and 40. The shaft of the roller 34 is journalled in fixed bearings 41. Movement measurement means consisting of a dial 42 calibrated to indicate movement in thirty-seconds of an inch, is mounted on a shaft 43 at the side of the machine, carrying a drum 44 positioned underneath the adjacent edge of the belt 32. Above the belt is a roller 45 adapted by means of a lever 46, through the weight of such lever, to press the roller 45 onto the belt and in turn to press the belt onto the drum 44. A cam 47 adapted to be actuated by a knob 48 is located below the lever so that such lever may be raised to lift the roller 45 or lowered to allow the roller to rest on the conveyor belt. On the shaft 43 of the dial is a small drum 49 to which is attached a cord 50, passing through a hole 51 in one end of the lever, over pulleys 52, 53 and down through another hole 54 in the lever to a small weight 55. The drum 49 has a flange 49$a$ in which is a notch 49$b$ adapted to be engaged by a light spring 56 to determine the zero position of the dial.

Only one optical system is provided and comprises a lamp 57, condenser 58, slit mask 59, focussing lens 60, mirror 61 and five partitions 62, 63, 64, 65 and 66. The projected beams 67, 68 are separated by the centre partition 64. Light reflected from the parallel lines of light on the object is collected by photo-cells 69 and 70, the function of the further partitions being to exclude extraneous light and to ensure that the main light reaching each cell is from its respective line of light on the object.

At the front of the machine are guides 71 on which a specimen holder in the form of a velvet covered flat plate 72 may be placed, said specimen holder having on its underside a positioning peg 73 adapted to be engaged with any one of a series of holes 32$a$ in the belt. At the rear end of the machine are further and inclined guides 74 for delivery of the specimen after test. At opposite sides of the machine are knobs 75, 76 for potentiometers respectively for balancing the photo-cells to get initial zero reading on the galvanometer and for varying the sensitivity of the device by controlling the input to the galvanometer.

In operation, a specimen plate is placed on the guide 71 and the belt turned to engage the peg 73 with one of the holes 32$a$. With the light system in operation the knob 37 is turned until a maximum reading is shown on the galvanometer. The knob 48 has been initially set to lift the roller 45 so that the dial 42 is re-set to zero by the action of the weight 55. The knob 48 is now turned to press the belt 32 against the roller 44 so that further movement of the belt will turn the dial. The knob 37 is then turned until the next maximum galvanometer reading is reached, at which point the dial indicates the distance $x$ of Fig. 3. Further rotation of the knob 37, ejects the sample and the weight 55 may, if necessary, engage the lever 46 to raise the same and prevent overwind of the dial mechanism.

What I claim is:

1. Apparatus for measuring the staple length of fibres in a specimen of loose fibres in the form of a double fringed layer of substantially parallel fibres on a flat non-reflecting holder therefor, such as a flat surfaced plate covered with black velvet, comprising an optical projection system including means for projecting a pair of parallel and close lines of light onto said holder, and transversely across the fibres; means for effecting relative movement of the holder and light system in the direction of the fibres; a light-sensitive optical system observing the reflection of each line of light from the fringed boundaries of the fibre layer; electrical means, such as a galvanometer, for indicating the position of maximum difference of reflectivity indicated along said parallel lines in the fringed region at opposite sides of the fiber layer; and means for measuring the distance of relative movement between the holder and optical projection system from one fringed side to the other fringed side of the fibre layer to give the modal length of the fibres in the specimen.

2. Apparatus for measuring the staple length of fibres of varying lengths arranged in a fringed layer of substantially parallel fibres, comprising in combination; a specimen holder for mounting said fringed layer; an endless conveyor belt adapted to carry said specimen holder; means for moving said belt and said specimen holder in the direction of said fibres; an optical projection system arranged to project two close and parallel lines of light onto the fringed layer mounted on said holder and transverse to the direction of movement of the belt; light-sensitive optical systems for collecting light reflected from the fibre layer at each line of light; an electric galvanometer connected to said light-sensitive systems for indicating any difference of reflected light intensity from said fibre layer; and means connected to the conveyor belt for measuring movement of the belt to indicate distance of movement of the fibre layer between indications of maximum difference of reflected light intensity taken along said parallel lines at the two ends of the fibre layer.

3. Apparatus for measuring the staple length of fibres in a double-fringed layer of substantially parallel loose fibres on a flat substantially non-reflecting surface comprising, in combination, a light system for projecting a pair of parallel and close lines of light onto said flat non-reflecting surface and transversely across said double-fringed layer of fibres, so that said lines of light are reflected by said double-fringed layer; means for effecting a relative movement of said double-fringed layer of fibres and said light system in the direction of said fibres; photo-electric means responsive to the reflection of each line of light from said double-fringed layer of parallel fibres for indicating the positions of maximum difference of intensity of reflection from said parallel lines of light in the fringed regions at opposite sides of said double-fringed layer; and means for measuring the distance of relative movement between said double-fringed layer and said light system from the position of maximum difference of intensity of reflection from said parallel lines of light in the fringed region at one side of said double-fringed layer to the position of maximum difference of intensity of reflection from said parallel lines of light in the fringed region at the opposite side of said double-fringed layer.

4. Apparatus for measuring the staple length of fibres in a double-fringed layer of substantially parallel loose fibres on a flat substantially non-reflecting surface comprising, in combination, a light system for projecting a pair of parallel and close lines of light onto said flat non-reflecting surface and transversely across said double-fringed layer of fibres, so that said lines of light are reflected by said double-fringed layer; means for effecting a relative movement of said double-fringed layer of fibres and said light system in the direction of said fibres; and photo-electric means responsive to the reflection of each line of light from said double-fringed layer of parallel fibers for indicating the positions of maximum difference of intensity of reflection from said parallel lines of light in the fringed regions at opposite sides of said double-fringed layer, the distance between said positions determining the staple length of the fibres in said double-fringed layer.

5. Apparatus for measuring the staple length of fibres in a double-fringed layer of substantially parallel loose fibres on a flat substantially non-reflecting surface comprising, in combination, means for projecting a pair of parallel and close lines of light onto said flat non-reflecting surface in the fringed regions of said double-fringed layer of fibres so that said lines of light are reflected by the same, said projecting means and said double-fringed layer of fibres being movable relative to each other in direction of said fibres; photo-electric means responsive to the reflection of each line of light from said fringed regions of said double-fringed layer of parallel fibres for indicating the positions of maximum difference of intensity of reflection from said parallel lines of light in the fringed regions at opposite sides of said double-fringed layer, the distance between said positions determining the staple length of the fibers in said double-fringed layer.

6. In an apparatus for measuring the staple length of fibres in a fringed layer of substantially parallel fibres on a flat non-reflecting holder, in combination, an optical projection system including means for projecting a pair of parallel and close lines of light onto said holder, and transversely across the fibres; means for effecting relative movement of the holder and light system in the direction of the fibres; a light-sensitive optical system observing the reflection of each line of light electrically from the fringed region of the fibre layer; and electrical means for indicating the position of maximum difference of reflection indicated along said parallel lines of light in the fringed region of the fibre layer.

7. Apparatus for determining the staple length of fibers arranged in a layer, each of the fibers being substantially parallel to one another so that the ends of said layer are substantially perpendicular to each of said fibers, comprising, in combination, a specimen holder having a face on which said layer of fibers is arranged, said face having a light reflection coefficient substantially different from said fibers; means for moving said specimen holder in a direction substantially parallel with said fibers; means for projecting at least two separate narrow beams of light onto said layer, said beams of light being parallel to each other and closely spaced from one another and each of said beams being substantially perpendicular to said fibers; means for separately collecting the light reflected from said layer due to said respective light beams; means for comparing the amounts of separately collected reflected light; and means for registering the positions of said specimen holder when the difference between the separately collected reflected light beams is a maximum at each end of the layer.

8. Apparatus for determining the staple length of fibers arranged in a layer, each of the fibers being substantially parallel to one another so that the ends of said layer are substantially perpendicular to each of said fibers, comprising, in combination, a specimen holder having a face on which said layer of fibers is arranged, said face having an optical characteristic substantially different from said fibers; means for moving said specimen holder in a direction substantially parallel with said fibers; means for projecting at least two separate narrow beams of light onto said layer, said beams of light being parallel to each other and closely spaced from one another and each of said beams being substantially perpendicular to said fibers, said beams of light being reflected in different amounts from said fibers and said specimen holder face having different optical characteristics; means for separately collecting the reflected light from said layer and specimen holder face due to said respective light beams; means for comparing the amounts of separately collected reflected light; and means for registering the positions of said specimen holder when the difference between the separately collected optically affected light beams is a maximum at each end of the layer.

9. Apparatus for determining the staple length of fibers arranged in a layer, each of the fibers being spaced from and substantially parallel to one another so that the ends of said layer are substantially perpendicular to each of said fibers, comprising, in combination, a specimen holder having a face on which said layer of fibers is arranged, said face having an optical characteristic substantially different from said fibers; means for moving said specimen holder in a direction substantially parallel with said fibers; means for projecting at least two separate narrow beams of light onto said layer, said beams of light being parallel to each other and closely spaced from one another and each of said beams being substantially perpendicular to said fibers, said beams of light being reflected in different amounts from said fibers and said specimen holder face having different optical characteristics; photo-electric means for separately collecting the reflected light from said layer and specimen holder face due to said respective light beams and means for comparing the amounts of separately collected reflected light; and means for registering the positions of said specimen holder when the difference between the separately collected, reflected light beams is a maximum at each end of the layer.

10. A method of measuring the staple length of fibers of different lengths comprising the steps of preparing a substantially planar layer of fibers with said fibers extending substantially parallel to each other and having at least one fringed edge portion; exposing said layer to beams of light forming at least two lines of light extending substantially perpendicular to said parallel fibers and having a predetermined spacing from each other, so as to cause said lines of light to be reflected separately by said fibers; producing electrical values corresponding respectively to the amount of light reflected from the illumination of a region of said layer by each of said lines of light, moving said layer in direction of the length of said fibers to a first position in which said lines of light illuminate one end region of said layer and the difference between the electrical values corresponding to the amounts of reflected light of said individual light lines reaches a maximum; moving said layer from said first position in direction of the length of said fibers to a second position in which said lines of light illuminate the opposite end region of said layer and again the difference between the electrical values corresponding to the amounts of reflected light of said individual light lines reaches a maximum, so that the length of said second movement indicates the modal staple length of said fibers constituting said layer.

No references cited.